(12) United States Patent
Rangelow et al.

(10) Patent No.: US 8,689,359 B2
(45) Date of Patent: Apr. 1, 2014

(54) APPARATUS AND METHOD FOR INVESTIGATING SURFACE PROPERTIES OF DIFFERENT MATERIALS

(75) Inventors: Ivo W. Rangelow, Baunatal (DE); Tzvetan Ivanov, Ilmenau (DE); Burkhard Volland, Erfurt (DE); Teodor Gotszalk, Wroclaw (PL); Miroslaw Woszczyna, Wroclaw (PL); Jerzy Mielczarski, Houdemont (FR); Yanko Sarov, Kassel (DE)

(73) Assignee: Nano Analytik GmbH, Ilmenau (DE)

( * ) Notice: Subject to any disclaimer, the term of this patent is extended or adjusted under 35 U.S.C. 154(b) by 824 days.

(21) Appl. No.: 12/666,745
(22) PCT Filed: Jun. 26, 2008
(86) PCT No.: PCT/EP2008/058151
§ 371 (c)(1), (2), (4) Date: Oct. 27, 2010
(87) PCT Pub. No.: WO2009/000885
PCT Pub. Date: Dec. 31, 2008

(65) Prior Publication Data
US 2011/0047662 A1 Feb. 24, 2011

(30) Foreign Application Priority Data
Jun. 27, 2007 (DE) .......................... 10 2007 031 112

(51) Int. Cl.
G01Q 20/04 (2010.01)
G01Q 70/10 (2010.01)
G01Q 60/26 (2010.01)
G01Q 70/06 (2010.01)
G01Q 70/12 (2010.01)

(52) U.S. Cl.
CPC ................ *G01Q 20/04* (2013.01); *G01Q 70/10* (2013.01); *G01Q 60/26* (2013.01); *G01Q 70/06* (2013.01); *G01Q 70/12* (2013.01)
USPC ...................... 850/7; 850/57; 850/34; 850/58

(58) Field of Classification Search
USPC ........................................................ 850/7, 57
See application file for complete search history.

(56) References Cited

U.S. PATENT DOCUMENTS

| 5,856,672 A * | 1/1999 | Ried ................................. 850/9 |
| 6,189,374 B1 * | 2/2001 | Adderton et al. ............... 73/105 |

(Continued)

FOREIGN PATENT DOCUMENTS

| DE | 103 07 561 | 9/2004 |
| WO | 01/75427 | 10/2001 |

OTHER PUBLICATIONS

Pedrak et al., "Micromachined atomic force microscopy sensor with integrated piezoresistive sensor and thermal bimorph actuator for high-speed tapping-mode atomic force microscopy phase-imaging in higher eigenmodes", Journal of Vacuum Science and Technology B, 21 (6), Nov./Dec. 2003, pp. 3102-3107.*

(Continued)

*Primary Examiner* — Jack Berman
(74) *Attorney, Agent, or Firm* — Michael J. Striker

(57) ABSTRACT

The present invention relates to an apparatus and a method for investigating surface properties of different materials, which make it possible to carry out atomic force microscopy with a simplified and faster shear force method. The apparatus according to the invention is characterized by perpendicular orientation of the measuring tip of a self-actuated cantilever with respect to the surface of the sample. A piezoresistive sensor and a bimorph actuator are preferably DC-isolated. The measuring tip is in the form of a carbon nanotube, in particular. A plurality of cantilevers can be arranged in the form of a cantilever array which is characterized by a comb-like arrangement of individual pre-bent cantilevers. The method according to the invention is distinguished by a fast feedback signal on account of the distance between the measuring tip and the surface to be investigated being regulated using the change in a DC signal which supplies the actuator.

11 Claims, 4 Drawing Sheets

(56) References Cited

U.S. PATENT DOCUMENTS

Figure 1A:
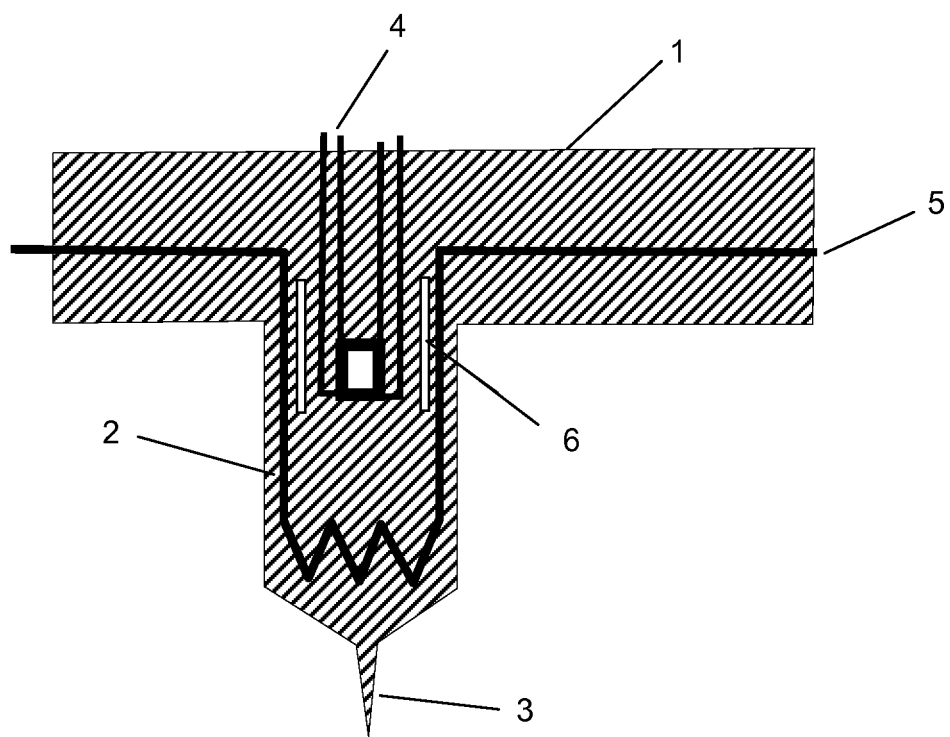

| | | | |
|---|---|---|---|
| 6,246,054 B1 * | 6/2001 | Toda et al. .................. | 850/1 |
| 6,664,540 B2 * | 12/2003 | Shimizu et al. ............. | 850/52 |
| 6,851,301 B2 * | 2/2005 | Kim et al. .................. | 73/105 |
| 2006/0238206 A1 | 10/2006 | Eng et al. | |

OTHER PUBLICATIONS

Ivo Rangelow et al: "Raster-Sonden-Mikroskipie Mit . . . " Technisches Messen 73, 2006, No. 9, pp. 485-492.

Ishikawa, M., et al: "Carbon Nanotube as a Probe for Friction . . . " Physica B Elsevier Netherlands, BD. 323, NR. 1-4, Oct. 2002, pp. 184-186.

Lei, F., et al: "Shear Force Detection by Using Bimorph . . . " Jounal of Applied Physincs, American Institute of Physics, New York, US, BD. 93, NR. 4, Feb. 15, 2003, pp. 2236-2243.

Ge, S., et al: "Shear Modulation Force . . . " Physical Review Letters APS USA, BD. 85, NR. 11, Sep. 11, 2000, pp. 2340-2343.

Iwo W. Rangelow: "Piezoresistive Scanning Proximity Probes . . . " Technisches Messen 72, 2005, 2, pp. 103-110.

* cited by examiner

APPARATUS AND METHOD FOR INVESTIGATING SURFACE PROPERTIES OF DIFFERENT MATERIALS

The invention is an apparatus and a method for investigating surface properties of a variety of materials using Atomic Force Microscopy (AFM) with the Shear-Force-Microscopy method.

Atomic Force Microscopy is widely used in both pure and industrial research when maximum resolution is required under normal ambient conditions, as in molecular biology, surface physics, pharmacology, material science or nanotechnology.

Because the critical dimensions of semiconductor components are becoming ever smaller (down to less than 50 nm) and are now barely susceptible to conventional microscopy, atomic force microscopes are often employed to check the production processes in this industry.

The method involves scanning the surface requiring investigation with an extremely pointed measuring tip secured laterally to the end of a micromechanical cantilever and thus not sharing the axis of the cantileve. In the state of the art in AFM, there are currently three recognised basic procedures:
- the contact method, in which the measuring tip is moved directly over the surface of the sample to feel its properties,
- the non-contact method, in which the cantilever is caused to vibrate in its natural frequency of resonance so that the point continually touches the surface of the sample for very brief periods, and
- the "shear force method", in which a system coupled to the measuring tip is stimulated into oscillation at a frequency close to a particular resonance of the system.

In this method, the measuring tip is positioned vertically in relation to the surface of the sample, so that the end of the probe vibrates horizontally, i.e. parallel to the surface of the sample.

The interaction between measuring tip and sample damps the oscillation and alters the resonance frequency of the system, usually raising it.

The latter two methods are advantageous mainly for very soft (biological) samples which change over time.

The patent DE 103 07 561 A1 makes known a measuring arrangement for the non-contact method (but also for the contact method) which combines the scanning and inspection of simply constructed microtechnical components with electrical contacts. The apparatus has a piezoresistive sensor and the heating wire-type actuator integrated into the cantilever.

This combination totally obviates use of the expensive and sensitive laser optics systems employed to date.

In addition, I. W. Rangelow's publication "Piezoresistive Scanning Proximity Probes for Nanoscience" on pages 103-110 of Technisches Messen 72 (2005) 2 describes this type of AFM probe (piezoresistive cantilever[s]) with an integrated bimetal actuator and measuring tips with a variety of functions.

The publication of I. W. Rangelow, T. Ivanova, B. E. Volland, D. Dontsov, Y. Sarov, K. Ivanova, A. Persaud, D. Filenko, N. Nikolov, B. Schmidt, M. Zier, T. Gotszalk, and T. Sulzbach entitled "Raster-Sonden-Mikroskopie mit Cantilever-Arrays", Technisches Messen 73 (2006) 9, pages 485-492, makes public the realisation of piezoresistive cantilever arrays. Here, several individual cantilevers are arranged in a single array in such a manner that topographical, physical and chemical analyses can be carried out not only with extreme precision and stability but also with the highest flexibility of measurement.

In all cantilevers known in the prior art, the measuring tip is more or less perpendicular to the plane of the cantilever. In certain experimental conditions, an undesired interaction may arise between the free end of the cantilever and the surface to be investigated and may lead to measurement errors or even to a mechanical crash of the AF microsope's measuring tip itself. Operation of the AFM is also rendered more difficult because preparation for measurement, the fine positioning of the measuring tip as it approaches the test surface, is complex and time-consuming, which means the AFM goes slowly. Parallel operation of conventional cantilevers in any sort of array is, furthermore, difficult to realise. Using the cantilevers known to the prior art makes for difficult work in a vacuum or at low (cryogenic) temperatures.

It is, therefore, the intention of the present invention to overcome these disadvantages and present an apparatus and method for the investigation of the surface properties of different materials which will succeed in carrying out atomic force microscopy using a less complicated and much more rapid shear force method, whereby parallel operation of several cantilevers will be feasible, even easy, and the crosstalk between actuator and sensor signals will be reduced.

The solution as invented is provided from the apparatus point of view by the features of the first claim 1n the patent and from the method point of view by the features of the ninth claim. Details of other favourable configurations of the apparatus as invented are given in the dependent claims.

The apparatus as invented is distinguished by the fact that there is a cantilever directed almost vertically downwards which is moulded onto a base in such a way that the angle between the surface to be investigated and the cantilever is almost exactly 90°. A measuring tip here effectively constitutes an extension of the lower end of the cantilever and is thus also vertical to the surface to be investigated.

In a preferred version, the apparatus contains several cantilevers organised into an array.

The apparatus as invented is thus characterised by vertical positioning of one self-actuated cantilever, or several, together with their measuring tips, in relation to the test surface. Preferably, there should be galvanic isolation between a piezoresistive sensor and a bimetal actuator. One favoured version uses a carbon nanotube as the measuring tip.

A cantilever array as invented is characterised by the comb-like disposition of individual, pre-curved cantilevers.

The method as invented for the investigation of surface properties of a variety of materials is characterised by a rapid feedback signal derived from the use of the change in the DC signal supplying the bimetal actuator to regulate the distance between the measuring tip and the test surface.

The stage on which the test sample is placed does not have to be moved along the z axis for the purpose. The mapping function of the AF microscope is achieved by the regulation of the distance of the tip on the cantilever from the surface, i.e. by checking the length of the cantilever (varied by bending) and not by movement of the stage along the z axis.

Below, the invention is explained in more detail with the aid of illustrations, numbered 1a, 1b and 2-5.

Figure 1B:
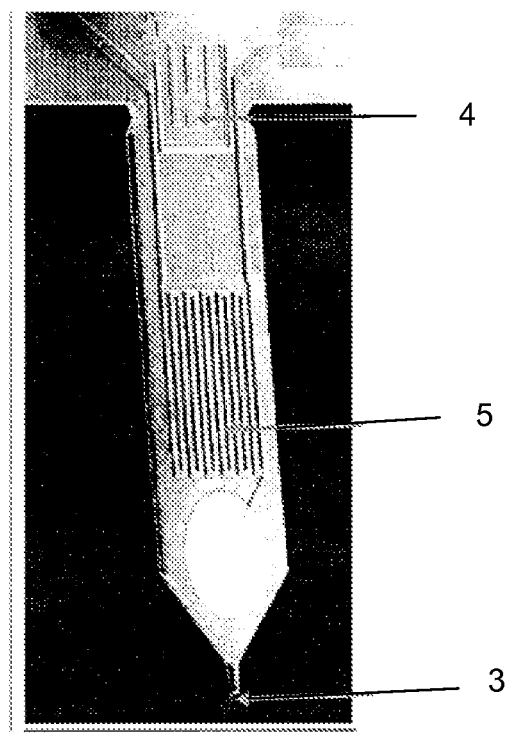
Figure 2:
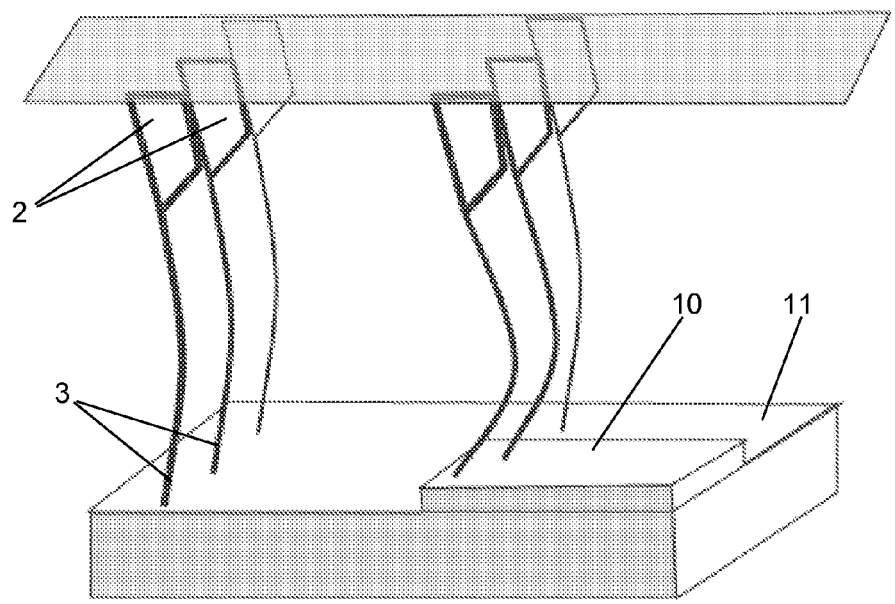
Figure 3:
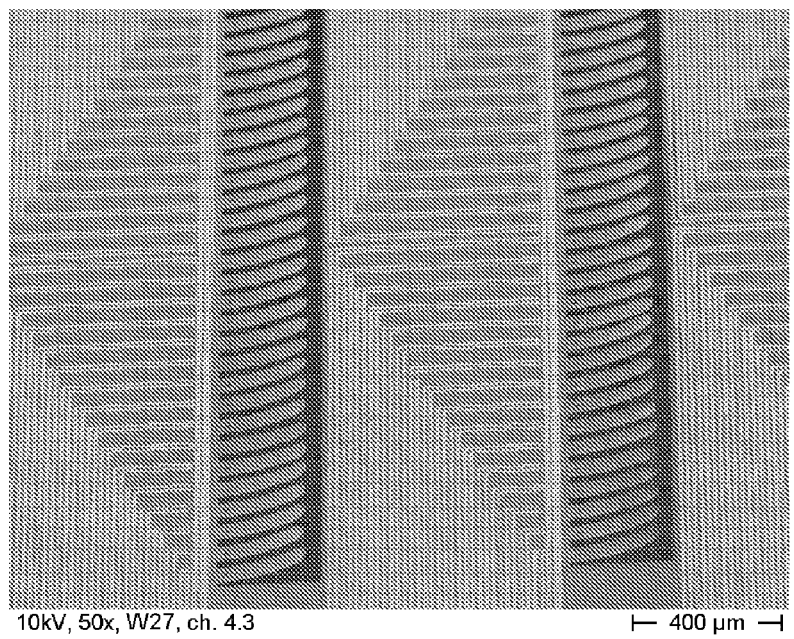
Figure 4:
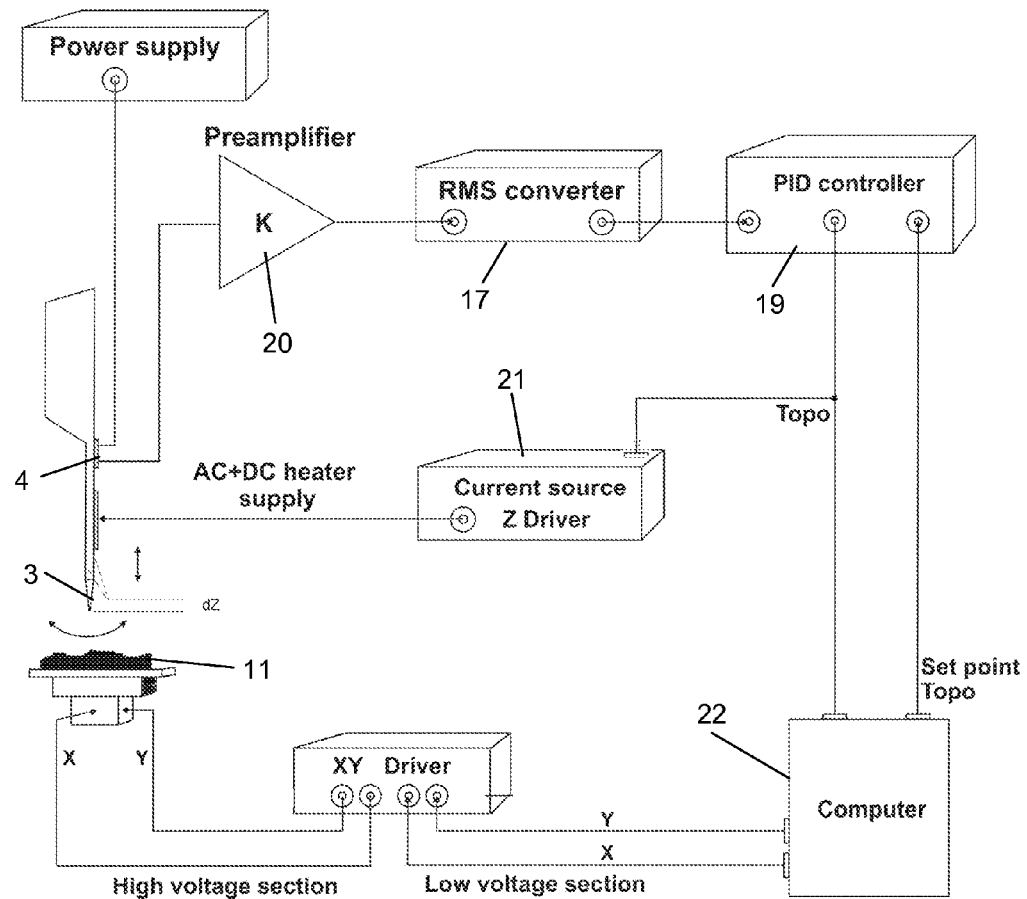
Figure 5:
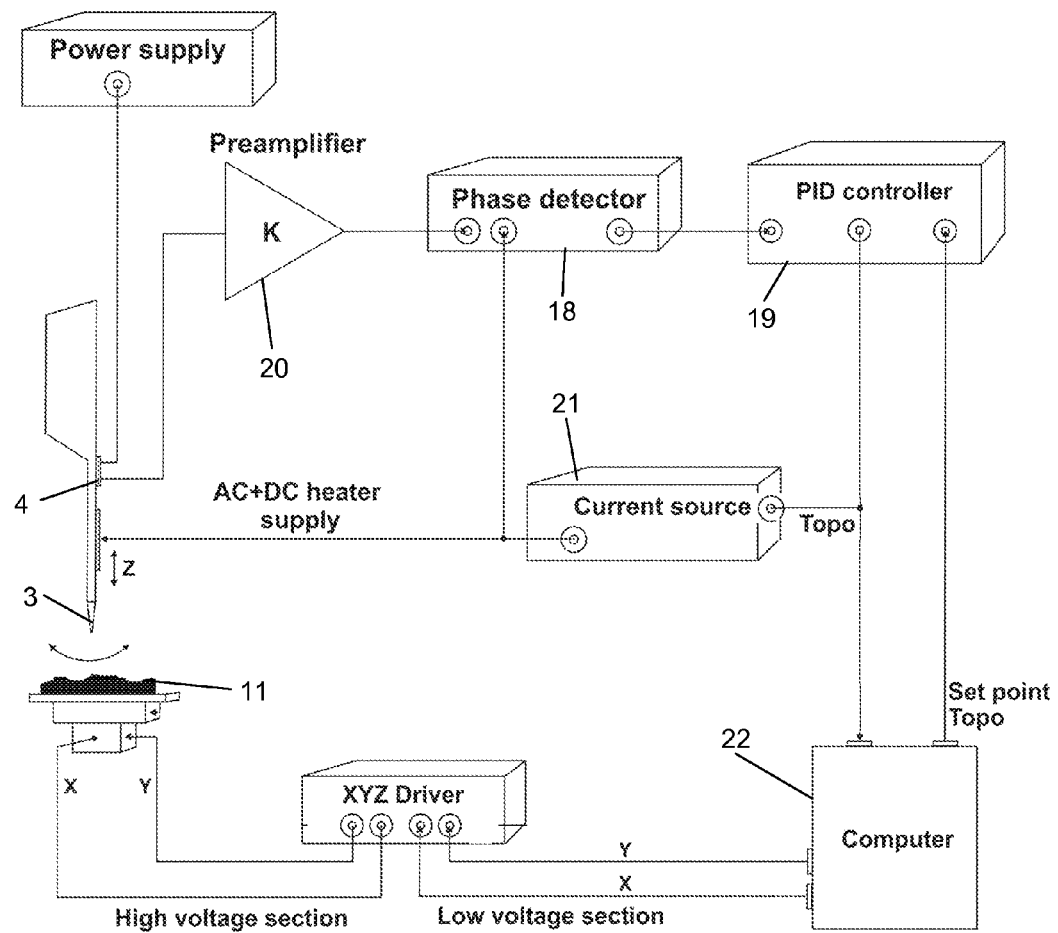

FIG. 1a: the principle behind the construction of the apparatus as invented, with a single cantilever FIG. 1b: photograph of an actual cantilever FIG. 2: the principle of an array FIG. 3: photograph of an actual array with pre-curved cantilevers FIG. 4: schematic representation of the circuit for an AFM with amplitude detection FIG. 5: schematic representation of a modified circuit for an AFM with phase detection.

In FIG. 1a the construction of the apparatus as invented for the investigation of surface properties is demonstrated in principle.

A photograph of the apparatus is shown in FIG. 1b.

Similarly, the procedural steps required for the operation of the apparatus as invented follow from the description below.

A micromechanical cantilever in the form of a bent wire, 1, is attached to a base, 1. Integrated into these two elements are a piezoresistive sensor, 4, to detect the deflection of a measuring tip, 3, and a thermal bimetal actuator, 5, to stimulate an oscillation of the cantilever. When alternative current flows through a heating wire constituting the bimetal actuator, 5, a periodic thermal wave is produced in the cantilever, 2. This thermal wave creates mechanical tension in the cantilever, 2 (this is the bimetal effect), which then causes periodic deflection in the cantilever, i.e. the measuring tip (this is the resonance oscillation).

Galvanic isolation in the form of an air gap is provided within the cantilever to avoid crosstalk between the actuator and sensor signals.

The measuring tip, 3, is in the form of a carbon nanotube, which is simple to attach to or mount on the lower end of the cantilever, 2.

The heating wire in the bimetal actuator, 5, is controlled by two signals, one of them AC and the other DC. The AC signal stimulates the resonance oscillations of the cantilever. At the same time, the static deflection of the measuring tip, 3, is modulated by means of a DC signal (i.e. the curvature in the cantilever).

The apparatus as invented thus also succeeds in scanning vertical surfaces (as in steps or recesses) and no longer is movement along the z axis necessary for the stage on which the test sample has been placed.

The principle of a cantilever array comprising several of the cantilevers, 2, as invented is shown in FIG. 2.

The vertical configuration of the cantilevers, 2, including their measuring tips, 3, permits them to be arranged in an array more simply than in the previous state of the art.

Each cantilever, 2, can be controlled individually, permitting even steps or recesses, 10, in a test surface, 11, to be accurately detected and mapped using an array.

As shown in FIG. 2, the individual cantilevers, 2, are pre-curved while the atomic force microscope is operating. When the DC signal is at its maximum, the curvature in the cantilever, 2, is at its greatest and the effective length of the cantilever is at its shortest, with the measuring tip, 3, at its furthest from the test surface, 11. This maximum distance defines the maximum height of a "step" which can be measured during the AFM scan.

The cantilever, 2, is at its maximum effective length when there is no DC signal at the heating wire (i.e. the cantilever is cold).

To permit any recesses in the test surface to be scanned by the AFM, the cantilever is (or the cantilevers are) pre-curved to a length between their shortest and longest effective length, i.e. there is a DC signal in the heating wire of the bimetal actuator, 5, setting the effective length of the cantilever to a median value.

In FIG. 3, the photograph is shown of an example of an actual cantilever array. In this case the individual cantilevers have been given various protective surfaces, each characterised by different internal stress, with the effect of curving the cantilevers in their comb-like array. This type of formation achieves extremely rapid and high-precision investigation of a test surface.

The method as invented for the operation of the apparatus described is distinguished particularly by the fact that it makes possible internal stimulus of the oscillation of the micromechanical cantilever, 2, and simultaneous detection of how the measuring tip, 3, the test surface, 11, and the actual position of the measuring tip, 3, are interacting.

Furthermore, the method is distinguished by the very rapid and stable feedback signal, permitting mapping at video speeds (30-50 frames per second). Because the distance from the measuring tip, 3, to the test surface, 11, is controlled by modulation of the DC signal in the heating wire (used to curve the cantilever, 2), there is no longer any requirement to move along the z axis the stage on which the test sample has been placed.

When the interaction between the measuring tip and the test surface is being detected, a distinction is made between amplitude and phase detection.

A circuit enabling amplitude detection is shown in FIG. 4. In this type of detection, the amplitude of the oscillation in the cantilever is specifically detected, then rectified using an RMS converter, 17, used as the input signal for closed loop control of the distance between the measuring tip and the test surface, and fed into a PID controller, 19.

A circuit enabling phase detection is shown in FIG. 5. In the phase detection system, the difference in phase between the output signal of the piezoresistive sensor and the stimulation signal of the bimetal actuator is detected. The output signal from a phase detector, 18, regulates a PID controller, 19, in order to modulate the distance between the measuring tip, 3, and the test surface, 11.

It is possible to combine the two methods of detection, observing both the phase shift and the amplitude modulation simultaneously.

All measuring modes involve amplification of the output signal from the piezoresistive sensor, 4, by means of a low-noise AC preamplifier, 20. The output signal from the PID controller, 19, is connected to a current source, 21, by means of which the length of the cantilever (i.e. the pre-curvature) is regulated.

A computer, 22, in the atomic force microscope regulates the scanning of the test surface, 11, defines the ideal value for the regulation of the distance between the measuring tip and the test surface and is responsible for registering all the measuring signals.

With the apparatus as invented, the architecture of the atomic force microscope system is vastly simplified, making it possible to use shear-force AFM for many and varied applications, even within low temperature and vacuum systems. The cantilever oscillations are detected by measuring the output voltage of the piezoresistive sensor.

LIST OF NUMBERED REFERENCES

1—Base
2—Micromechanical cantilever
3—Measuring tip
4—Piezoresistive sensor
5—Thermal bimetal actuator
6—Galvanic isolation
10—Step
11—Test surface
17—RMS converter
18—Phase detector
19—PID controller
20—AC preamplifier
21—Current source
22—Computer

The invention claimed is:

1. Apparatus for investigating surface properties of different materials using atomic force microscopy (AFM) with the shear force method, comprising at least one base (1), to which at least one cantilever (2) is attached, with an integrated sensor (4), an integrated actuator (5) deflecting the cantilever (2) at right angles to its vertical axis, and at least one measuring tip (3),
wherein the cantilever (2) is attached virtually at right angles to the base (1), pointing downwards, the measuring tip (3) forms a coaxial extension of the lower end of the cantilever (2) resulting in an angle between a test surface (11) and the cantilever (2) including its measuring tip (3) is virtually 90° when at rest and that the integrated sensor (4) and the integrated actuator (5) are subject to galvanic isolation in the form of a gap (6).

2. Apparatus according to claim 1, wherein the sensor is a piezoresistive sensor (4).

3. Apparatus according to claim 2, wherein the actuator is a bimetal actuator (5).

4. Apparatus according to claim 3, wherein the actuator is a thermal bimetal actuator (5), comprising a heating wire supplied with direct current for the purpose of setting the measuring tip at an initial position.

5. Apparatus according to claim 4, wherein the piezoresistive sensor (4) and the bimetal actuator (5) are subject to galvanic isolation in the form of a gap (6).

6. Apparatus according to claim 1, wherein the cantilever (2) is pre-curved by an angle of +/−45 degrees from the vertical.

7. Apparatus according to claim 1, wherein the measuring tip (3) is a carbon nanotube.

8. Apparatus according to claim 1, wherein more than one cantilevers are configured as an array with each cantilever (2) possessing an individually controllable actuator (5) and a sensor with individually readable signal (4).

9. Method for investigating surface properties of different materials using atomic force microscopy (AFM) with the shear force method using apparatus according to claim 1, wherein at least one of an amplitude of oscillation of the cantilever or cantilevers (2) and an oscillation phase shift in the signal detected is registered by the sensor (4) and serves to map the test surface using an RMS converter (17) and a PID controller (19) and to modulate the distance between the measuring tip (3) and the test surface (11) along the z axis.

10. Method according to claim 9, wherein a direct current is applied to the actuator (5) of the apparatus, so that it presets the distance between the measuring tip (3) and the test surface (11).

11. Apparatus for investigating surface properties of different materials using atomic force microscopy (AFM) with the shear force method, comprising at least one base (1), to which at least one cantilever (2) is attached, with an integrated piezoresistive sensor (4), an integrated thermal bimetal actuator (5) deflecting the cantilever (2) at right angles to its vertical axis, and at least one measuring tip (3),
wherein the actuator comprises a heating wire supplied with direct current for the purpose of setting the measuring tip at an initial position, the cantilever (2) is attached virtually at right angles to the base (1), pointing downwards, the measuring tip (3) forms a coaxial extension of the lower end of the cantilever (2) resulting in an angle between a test surface (11) and the cantilever (2) including its measuring tip (3) is virtually 90° when at rest and the piezoresistive sensor (4) and the bimetal actuator (5) are subject to galvanic isolation in the form of a gap (6).

* * * * *